United States Patent
Ding et al.

(10) Patent No.: US 8,244,734 B2
(45) Date of Patent: Aug. 14, 2012

(54) APPARATUS AND METHOD FOR TRANSMITTING FILE AND APPARATUS AND METHOD FOR RECEIVING FILE

(75) Inventors: Hong Wei Ding, Beijing (CN); Jin Dong, Beijing (CN); Shi Xia Liu, Beijing (CN); Min Min Qiu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 463 days.

(21) Appl. No.: 12/608,482

(22) Filed: Oct. 29, 2009

(65) Prior Publication Data
US 2010/0114996 A1      May 6, 2010

(30) Foreign Application Priority Data
Oct. 31, 2008   (CN) .......................... 2008 1 0173270

(51) Int. Cl.
*G06F 17/00* (2006.01)

(52) U.S. Cl. ........................................ 707/741; 707/812
(58) Field of Classification Search .................. 707/812, 707/770, 610, 741
See application file for complete search history.

(56) References Cited

U.S. PATENT DOCUMENTS

| | | | |
|---|---|---|---|
| 5,765,170 | A  | 6/1998 | Morikawa |
| 6,185,550 | B1 | 2/2001 | Snow et al. |
| 7,346,622 | B2 | 3/2008 | Horvitz |
| 7,370,281 | B2 | 5/2008 | Weber |
| 7,386,530 | B2 | 6/2008 | Kiessig et al. |

*Primary Examiner* — Belix M Ortiz Ditren
(74) *Attorney, Agent, or Firm* — Vazken Alexanian (57) ABSTRACT

Apparatus and method for transmitting file and apparatus and method for receiving file. The apparatus for receiving a file includes: a receiving device configured for receiving a file and at least one tag path associated with the file; a path selection device configured for selecting from candidate paths at least one path where a similarity between the tag vector of the lowest node and the tag vector of the highest node in each of the tag path exceeds a predetermined threshold, as a storage path; and a storage device configured for storing the file under the storage path.

13 Claims, 5 Drawing Sheets

APPARATUS AND METHOD FOR TRANSMITTING FILE AND APPARATUS AND METHOD FOR RECEIVING FILE

CROSS REFERENCE TO RELATED APPLICATION

This application claims priority under 35 U.S.C. 119 from Chinese Patent Application 200810173270.7, filed Oct. 31, 2008, the entire contents of which are incorporated herein by reference.

BACKGROUND OF THE INVENTION

1. Field of the Invention

The present invention relates to file exchanges between computers in a network environment. More particularly, the present invention relates to an apparatus and a method for transmitting a file and to an apparatus and a method for receiving a file.

2. Description of Related Art

Applications based on computer networks are increasingly widespread. File exchanges occur frequently in various computer network applications such as Web file upload and download, file transmission in instant message applications such as IBM Sametime, Microsoft Windows Live Messenger, Google Talk, in attachment transmission in email applications such as Microsoft Outlook, and in file download in P2P applications such as EMULE, and BT.

In current file exchange applications, a receiving user must select a storage directory for a received file. Even if the user has established a directory structure of specific meaning, the apparatus for receiving the file employed by the user cannot automatically select a storage directory matching the file according to the file's own characteristics without user intervention.

Further, even with user intervention, it is difficult for the user to select a storage directory matching the file because of the difficulty of immediately knowing details about the received file. Moreover, user intervention can reduce the efficiency of the file exchange.

SUMMARY OF THE INVENTION

An object of the present invention is to provide an apparatus and methods for transmitting a file and for receiving a file, so a reasonable storage directory for the file may be automatically selected, thereby increasing the efficiency of file exchange.

In accordance with one aspect of the present invention, apparatus for receiving a file includes: a receiving device configured for receiving a file and at least one tag path associated with the file, the tag path having a lowest node and a highest node, each said node having a tag vector; a path selection device configured for selecting, as a storage path, at least one path from two or more candidate paths, where a similarity between the tag vector of the lowest node and the tag vector of the highest node in each tag path exceeds a predetermined threshold; and a storage device configured for storing the file under the storage path.

In accordance with another aspect of the present invention, apparatus for transmitting a file includes: a path obtaining device configured for obtaining a tag vector for each node in the path of a file to be transmitted in a hierarchical tree structure, and generating a tag path for the file; and a transmitting device configured for transmitting the tag path and the file.

In accordance with yet another aspect of the present invention, a method of receiving a file includes the steps of: receiving a file; receiving at least one tag path associated with the file; selecting as a storage path at least one path for which a similarity between the tag vector of the lowest node and the tag vector of the highest node exceeds a predetermined threshold; and storing the file under the storage path.

In the embodiments of the present invention, the tag path provides information about the received file, and a storage path for the file can be selected according to the tag path. This makes it possible to automatically select a reasonable storage directory for the received file, thereby increasing the efficiency of file exchange.

BRIEF DESCRIPTION OF THE DRAWINGS

The above and other aspects, features and advantages of the present invention will be easily appreciated in view of the following description by referring to the accompanying figures. In the accompanying drawings, identical or corresponding technical features or components are represented with identical or corresponding reference numbers.

DETAILED DESCRIPTION OF THE PREFERRED EMBODIMENTS

The embodiments of the present invention are described with reference to the drawings. It is to be noted that, for purpose of clarity, representations and descriptions about those components and processes known by those skilled in the art but unrelated to the present invention are omitted in the drawings and the description.

Network environments such as Web provide a large amount of file resources for the public. The network environments maintain tags for the files for ease in retrieving and identifying the files. The tag is a key word reflecting the characteristics of a file. For example, tags can be attached to contents of blogs in a blog application based on Web 2.0, e.g., logs, linked pages, files and so on, to indicate the subjects, classes and the like involved by the contents. In the blog application, it is possible for an administrator to specify the tags, and it is also possible to define or recommend the tags by browsers.

Files are usually organized into a hierarchical tree structure for the convenience of managing the files. Examples of the hierarchical tree structure include directory structure of the file system, tree structure based on uniform resource identifier (URL), class tree structure and the like. See U.S. Pat. No. 6,185,550, issued to William A. Snow et al. for "Method and Apparatus for Classifying Documents within a Class Hierarchy Creating Term Vector, Term File and Relevance Ranking."

Figure 1:
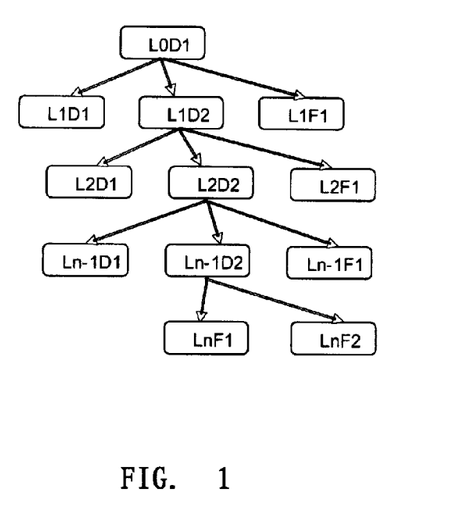
FIG. 1 is a schematic diagram showing a file organization structure based on the file system directory structure.

FIG. 1 is a schematic diagram showing a file organization structure based on the file system directory structure. As shown in FIG. 1, a hierarchical tree directory structure is adopted in the file system, where LxDy represents the $y^{th}$ directory in the $x^{th}$ layer of the file system, LxFy represents the $y^{th}$ file under a directory in the $(x-1)^{th}$ layer of the file system. A directory may act as a parent directory to posses child directories. Directional arrows are used to indicate the relation between parent directories and their child directories in FIG. 1. Files in the directories have tags.

In embodiments of the present invention, a file may have more than one tag. Files and directories may have tag vectors. The tag vector for a file refers to a set of all the tags for the file. The tag vector for a directory refers to a union of all the tags for all the files and all the direct child directories, if any, in the directory. Upon creating a directory, it is possible to add a default tag to its tag vector, e.g., add a text obtained from the directory name as a tag to its tag vector, in order to prevent the tag vector for the directory from becoming a null set.

Figure 2:
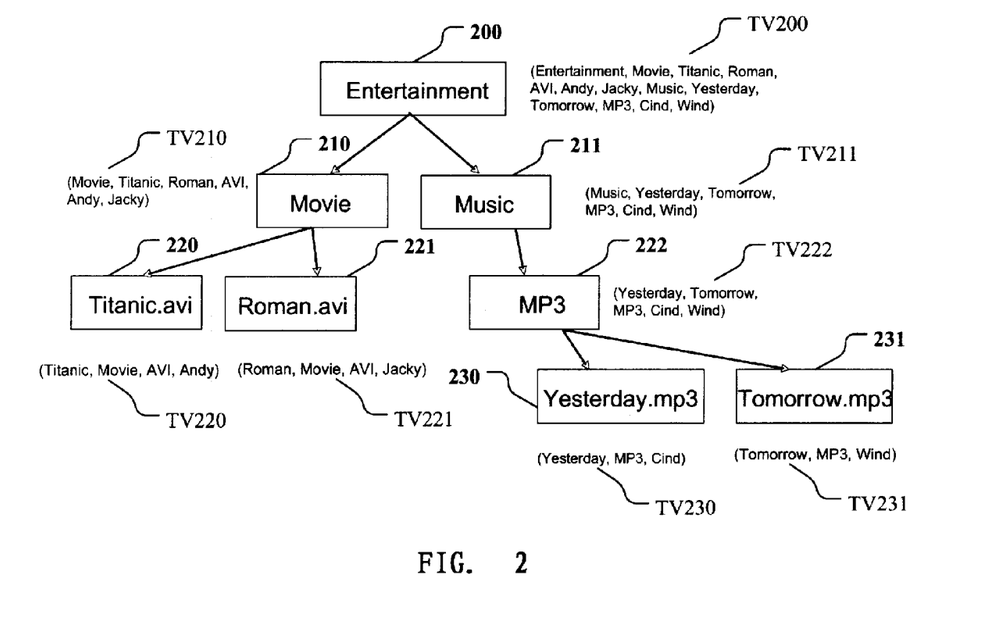
FIG. 2 shows a specific example of the file organization structure based on the file system directory structure.

FIG. 2 shows a specific example of the directory structure in the file system according to the present invention. FIG. 2 shows directories 200, 210, 211, 222, files 220, 221 in the directory 210, and files 230, 231 in the directory 222. Respective tag vectors for the directories 200, 210, 211, 222 are indicated by TV200, TV210, TV211, TV222, respectively. Tag vectors for files 220, 221, 230, 231 are indicated by TV220, TV221, TV230, TV231, respectively.

In a tree structure based on uniform resource identifier (URL), domains are similar to the directories. The tag vector for a domain refers to a union of all the tags for all the files and all the direct sub-domains, if any, in the domain. Upon creating a domain, it is possible to add a default tag to its tag vector, e.g., add a text obtained from the domain name as a tag to its tag vector, in order to prevent the tag vector for the domain from becoming a null set.

In the class tree structure, classes are similar to the directories. The tag vector for a class refers to a union of all the tags for all the files and all the direct sub-classes (if any) in the class. Upon creating a class, it is possible to add a default tag to its tag vector, or add a text obtained from the class name as a tag to its tag vector, in order to prevent the tag vector for the class from becoming a null set.

In the following, the embodiments of the present invention are described by taking the directory structure of the file system as an example. It should be noted that the embodiments of the present invention are also applicable to other file organization structure based on hierarchical tree.

It is possible to adopt a technique similar to that in the blog application to maintain tags for files and directories, e.g., setting, adding, deleting, modifying, storing and retrieving the tags. Various techniques may be adopted to store and retrieve the tags for the files and directories. For example, it is possible to store and retrieve the tags through default files corresponding to the files and directories, or it is possible to store and retrieve the tags through a database or electronic sheet. In response to the changes to the files and directories, e.g., adding, deleting, moving, altering file name, or directory name, or upon changing the tag vectors for the files and directories, the file system updates the tag vectors for affected directories in the directory structure.

The user usually establishes a directory structure by following a certain pattern. Specifically, the user usually considers that a directory represents one class, and a child directory or file represents one sub-class of the class. It is possible to understand the class as a general concept, and the sub-class as a specific concept. It is possible to define a concept through its extension, and the tag vector for a file or directory may serve as an extension to define the concept. As described earlier, the tag vector for a directory refers to a union of all the tags for all the files and all the direct child directories, if any, in the directory. As shown in the example of FIG. 2, there is generally a generic concept-specific concept relation between the tag vectors for parent directories and the files and child directories therein, if any.

Figure 3:
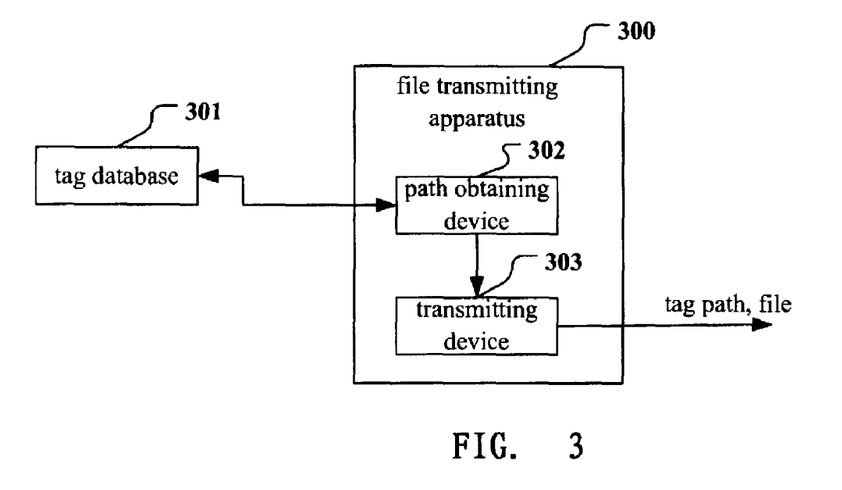
FIG. 3 is a block diagram showing a file transmitting apparatus according to an embodiment of the present invention.

FIG. 3 is a block diagram showing a file transmitting apparatus 300 according to an embodiment of the present invention. As shown in FIG. 3, the file transmitting apparatus 300 includes a path obtaining device 302 and a transmitting device 303. Depending on specific file exchange applications, the file transmitting apparatus 300 may have a corresponding implementation form. For example, in a Web file download application, the file transmitting apparatus 300 may be included in a Web server; in an email or instant message application, the file transmitting apparatus 300 may be included in email clients or instant message clients.

If a file is to be transmitted, the path obtaining device 302 can obtain the file path for the file in the file system, i.e., the path in the file organization structure. The path obtaining device 302 obtains the tag vector for each node in the file path. The nodes in the file path represent directories of respective levels included in the file path. Preferably, a node may also represent a file itself. The path obtaining device 302 generates a tag path for the file by using the tag vectors for the respective nodes in the order of the nodes in the file path. The tag path may be considered as a path obtained by replacing nodes in the file path with corresponding tag vectors. For example, the tag path for the file 220 as shown in FIG. 2 may be "(Entertainment, Movie, Titanic, Roman, AVI, Andy, Jacky, Music, Yesterday, Tomorrow, MP3, Cind, Wind)\(Movie, Titanic, Roman, AVI, Andy, Jacky)\(Titanic, Movie, AVI, Andy)", which corresponds to the case where node can also represent files, or "(Entertainment, Movie, Titanic, Roman, AVI, Andy, Jacky, Music, Yesterday, Tomorrow, MP3, Cind, Wind)\(Movie, Titanic, Roman, AVI, Andy, Jacky)", which corresponds to the case where nodes can only represent directories.

As shown in FIG. 3, the path obtaining device 302 obtains corresponding tag vectors from a tag database 301 according to respective nodes in the file path. The tag database 301 stores tag vectors corresponding to the nodes by associating them with the nodes (files or directories in the present embodiment), so that it is possible to retrieve corresponding tag vectors according to the nodes. If the tag vectors are stored in the file system, the path obtaining device 302 may also obtain the tag vectors from the file system.

Alternatively, the tag database 301 may also store the tag paths for the files. In this case, the path obtaining device 302 may obtain the tag path for the file to be transmitted directly from the tag database 301 according to the file. For example, in an application for a user to upload a file to be downloaded by others, the user uploads the file along with the tag path for the file, i.e., the tag path local to the user, and the tag path is recorded in the tag database 301. Alternately, it is also possible to manually or automatically input tag paths to configure the tag database 301.

The transmitting device 303 transmits the tag path obtained by the path obtaining device 302 and the file. The tag path may be transmitted in various ways. For example, it is possible to prescribe a process of transmitting the tag path in communication protocols, to transmit the tag path as a file, e.g., an attachment in the email application, to include the tag path as a portion of the file according to a prescribed format, and the like.

Alternatively, it is possible to transmit the tag path before transmitting the file, so that the receiving party can select a file path in advance according to the tag path.

One file may have more than one tag path associated therewith. For example, in the above application for a user to upload a file to be downloaded by others, when different users upload the same file, tag paths local to the users are also uploaded. The tag database 301 may record the different tag paths associated with the file. The tag paths from different users reflect different selections to storage location for the same file, and thus can provide more references for other users to determine the storage location. In this case, the path obtaining device 302 may obtain any or all of these tag paths, and the transmitting device 303 transmits the obtained tag paths.

Figure 4:
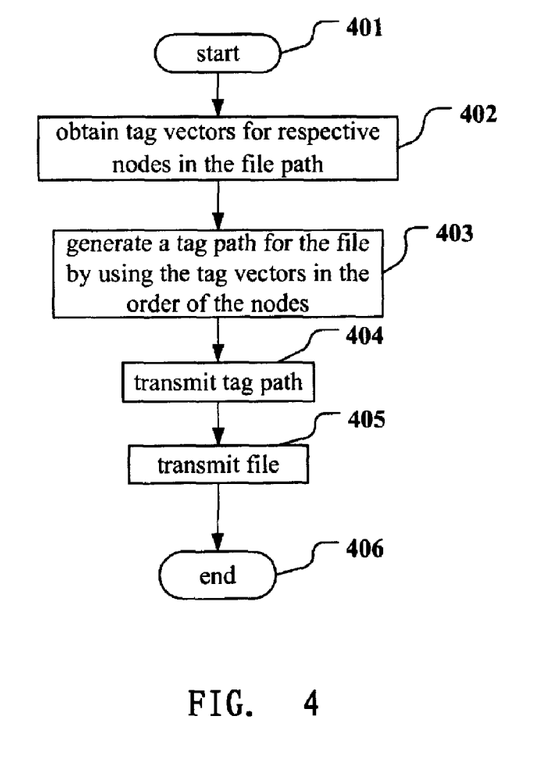
FIG. 4 is a flow chart showing a file transmitting method according to an embodiment of the present invention.

FIG. 4 is a flow chart showing a file transmitting method according to an embodiment of the present invention. As shown in FIG. 4, the method starts from step 401. At step 402, tag vectors for respective nodes in the file path, i.e., the path in the file organization structure, of the file to be transmitted in the file system are obtained, e.g., from the tag database or the file system. At step 403, a tag path for the file is generated by using the tag vectors for the respective nodes in the order of the nodes in the file path. At step 404, the obtained tag path is transmitted. At step 405, the file is transmitted. Then the method ends at step 406.

As described earlier, one file may have more than one tag paths associated therewith. In this case, it is possible to obtain any or all of these tag paths, and transmit the obtained tag paths.

Figure 5:
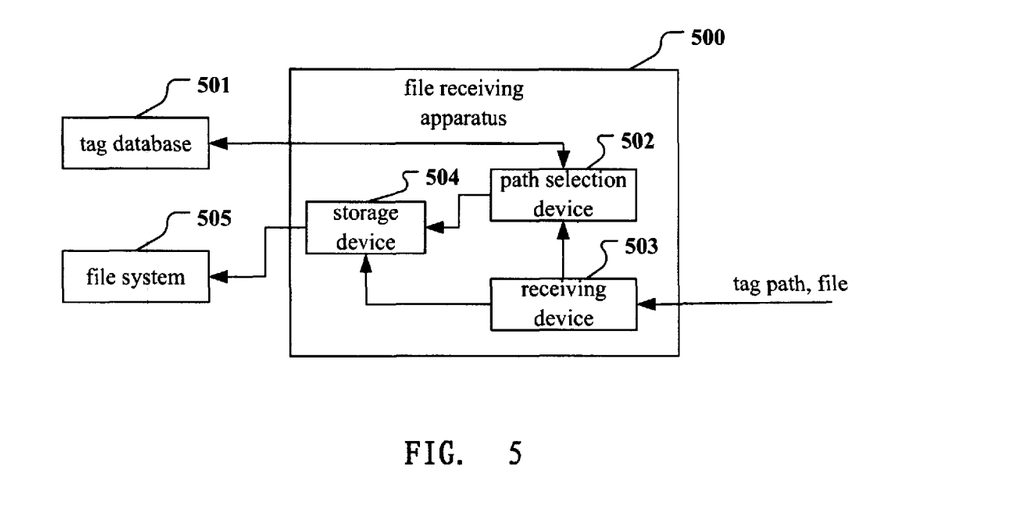
FIG. 5 is a block diagram showing a file receiving apparatus according to an embodiment of the present invention.

FIG. 5 is a block diagram showing a file receiving apparatus 500 according to an embodiment of the present invention. As shown in FIG. 5, the file receiving apparatus 500 includes a receiving device 503, a path selection device 502 and a storage device 504. Depending on specific file exchange applications, the file receiving apparatus 500 may have a corresponding implementation form. For example, in a Web file download application, the file receiving apparatus 500 may be included in a Web browser; in an email or instant message application, the file receiving apparatus 500 may be included in email clients or instant message clients.

The receiving device 503 receives the file and the tag path associated with the file. The receiving device 503 may receive one or more tag paths associated with the file. As indicated in the following, more tag paths may increase the possibility of selecting a more suitable storage path by the receiving party.

The path selection device 502 selects as the storage path a suitable path from the candidate paths in the file system 505 according to the received tag path.

Because of the usage for storing a file, the nodes in the candidate paths here represent directories rather than files. The candidate paths or candidate storage paths may include all the possible paths in the file system 505, or all the possible paths within a predetermined directory range. The tag database 501 also manages path information, i.e., in case of storing all of the above possible paths, the information about the candidate paths may be obtained from the tag database 501. Alternatively, the path selection device 502 may also obtain the information about the candidate paths directly from the file system 505.

The path selection device 502 selects from all the candidate paths a candidate path where the similarity between the tag vector of the lowest node in the selected candidate path and the tag vector of the highest node in the tag path exceeds a predetermined threshold, as the storage path.

The path selection device 502 may obtain corresponding tag vectors from the tag database 501 according to respective nodes in the candidate paths. If the tag vectors are stored in the file system, the path selection device 502 may also obtain the tag vectors from the file system.

As described earlier, the tag path may be transmitted in various ways. The path selection device 502 may extract the tag path according to the adopted transmission way.

The similarity between the tag vectors may be measured through various methods. For example, it is possible to simply represent the similarity by the number of tags common to the two tag vectors, or to represent the similarity by a ratio between the number of common tags and the number of tags in a union of the two tag vectors. It is also possible to measure the similarity based on methods such as vector space model, support vector machine (SVM) model, Gauss mixture model (GMM) and etc.

Figure 7:
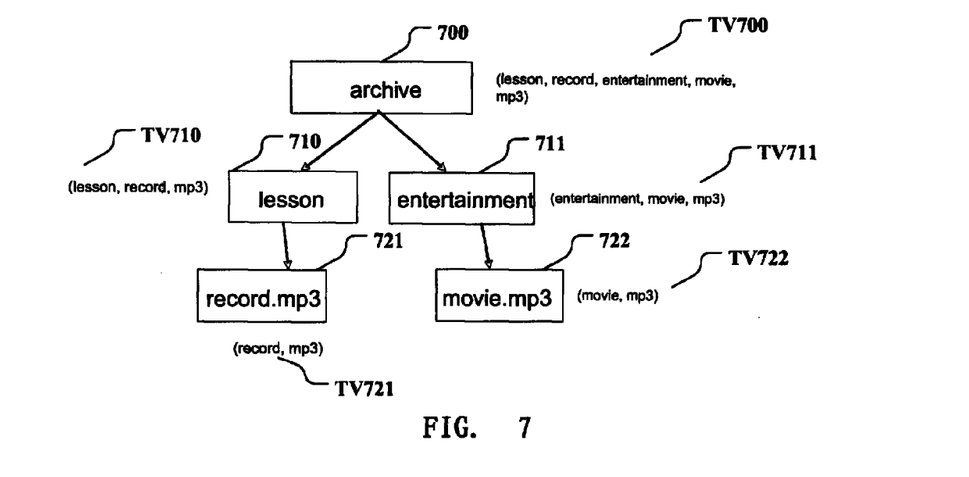
FIG. 7 shows an exemplary file organization structure.

An example showing how the path selection device 502 selects the storage path is described with reference to FIG. 7. FIG. 7 shows an exemplary directory structure. It is assumed that the file received by the receiving device 503 is an MP3 file for entertainment, and the received tag path is "(entertainment, MP3)\(MP3)." It is also assumed that the range of the candidate paths is as shown in FIG. 7, the similarity is measured simply by the number of common tags, and the predetermined threshold is one common tag. Among all the candidate paths as shown in FIG. 7, there are 2 common tags between a tag vector TV711 "(entertainment, movie, MP3)" for the lowest node 711 in a candidate path "archive\entertainment" and a tag vector "(entertainment, MP3)" for the highest node in the tag path "(entertainment, MP3)\(MP3)". It can be seen from this example that the path selection device 502 has to select the candidate path "archive\entertainment" as the storage path.

The tag path for a file reflects a concept of the file, i.e., a class structure. Knowing the class structure for a file can be helpful to more reasonably select the storage path for the file. Specifically, from the tag path, it is possible to know the generic class the file belongs to. In selecting the storage path, it is possible to preferentially select a directory more matching the generic class, to avoid selecting a storage path irrelevant to the characteristics of the file. For example, it is assumed that the file is an MP3 file for entertainment, and its tag path is "(entertainment, MP3)\(MP3)." In addition, it is assumed that the file system of the receiving party has a directory structure as shown in FIG. 7. The directory structure includes directories 700, 710, 711 and files 721, 722, and their tag vectors are respectively indicated by TV700, TV710, TV711 and TV721, TV722.

As shown in the figure, the directories 710 and 711 are associated with MP3. If the selection of the storage path is only based on the tag vector for the file, there is a possibility that the directory 710 is selected as the storage path, but this is not proper because the directory 710 represents a class of lesson, and is irrelevant to entertainment. However, by taking the generic class into consideration, the directory 710 will not be selected.

Referring again to FIG. 5, the storage device 504 stores the file received by the receiving device 503 under the storage path selected by the path selection device 502 in the file system 505.

Figure 6:
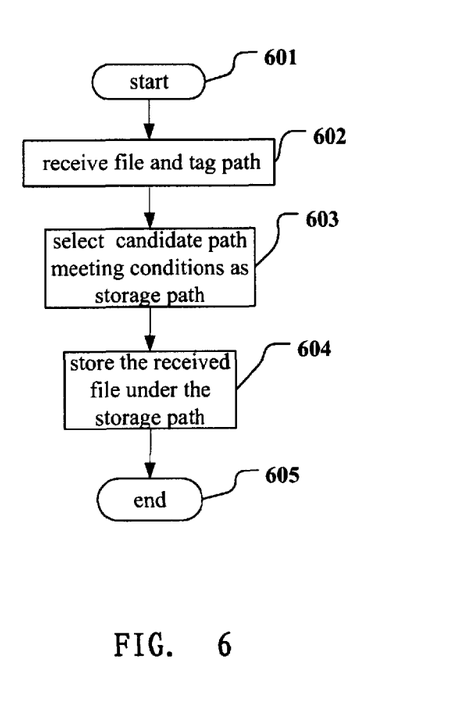
FIG. 6 is a flow chart showing a file receiving method according to an embodiment of the present invention.

FIG. 6 is a flow chart showing a file receiving method according to an embodiment of the present invention. As shown in FIG. 6, the method starts with step 601. At step 602, the file and the tag path associated with the file are received.

It is possible to receive one or more tag paths associated with the file. More tag paths may increase the possibility of selecting a more suitable storage path by the receiving party. At step 603, a candidate path is selected from candidate paths in the file system as the storage path, so that the similarity between the tag vector of the lowest node in the selected candidate path and the tag vector of the highest node in the tag path exceeds a predetermined threshold. At step 604, the received file is stored under the selected storage path in the file system. At step 605, the method ends.

In the above embodiments, only the tag vector for the highest node in the tag path is used for selecting from the candidate paths. If the selection can be made with reference to the tag vectors for more nodes, a storage path more accurately reflecting the classification may be selected.

In a preferred embodiment, a candidate path meeting the following conditions is selected by the path selection device 502 or through step 603 as the storage path:

(1) for each node in the tag path, there is a node corresponding to the each node in the selected path;

(2) the level order between adjacent nodes in the tag path is consistent with that between corresponding nodes in the selected path; and (3) the similarity between the each node of the tag path and the corresponding node in the selected path is greater than that between any node below the each node and its corresponding node.

In this preferred embodiment, it is possible to select from the candidate paths through various methods. For example, it is possible to determine whether each of the candidate paths meets the above conditions one by one, until the candidate path meeting the conditions is found. Alternately, it is possible to filter out a candidate path meeting the conditions step-by-step by using any condition of the conditions (1), (2), (3). Preferably, it is possible to select a candidate path meeting the above conditions through the method as shown in FIG. 8.

Figure 8:
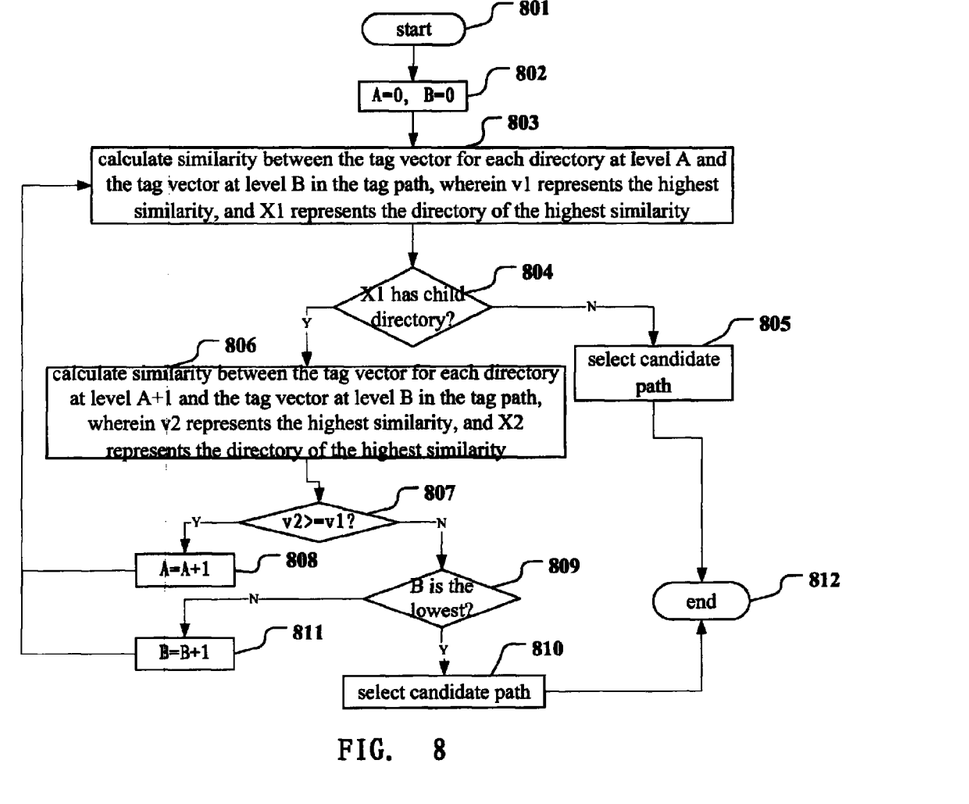
FIG. 8 is a flow chart showing a method of selecting from candidate paths according to a preferable embodiment of the present invention.

FIG. 8 is a flow chart showing a method of selecting from candidate paths according to a preferable embodiment of the present invention. As shown in FIG. 8, the method starts from step 801. At step 802, let A=0, B=0, where A represents a level in the hierarchical tree directory structure of the file system, wherein A=0 represents the highest level, and B represents a level of node in the tag path, wherein B=0 represents the highest level. At step 803, a similarity between the tag vector for each directory at level A in the directory structure and the tag vector at level B in the tag path is calculated, wherein v1 represents the highest similarity, and X1 represents the directory of the highest similarity. At step 804, a determination is made as to whether directory X1 has a child directory.

If there is no child directory, at step 805, a path corresponding to directory X1 is determined as the candidate path to be selected, and the method ends at step 812. If a child directory exists, the method proceeds to step 806. At step 806, a similarity between the tag vector for each directory at level A+1 in the directory structure and the tag vector at level B in the tag path is calculated, wherein v2 represents the highest similarity, and X2 represents the directory of the highest similarity. At step 807, a determination is made as to whether v2 is greater than or equal to v1. If yes, let A=A+1 at step 808 and the method returns to step 803. If no, at step 809, a determination is made as to whether level B is the lowest level in the tag path. If yes, at step 810, a path corresponding to directory X1 is determined as the candidate path to be selected, and the method ends at step 812. If no, let B=B+1 at step 811 and the method returns to step 803.

The method as shown in FIG. 8 is described in connection with the directory structure shown in FIG. 2. Here, the vector space model is adopted to measure the similarity. For a directory D, a weight vector $(k_1, k_2, \ldots k_N)$ is used to represent the tag vector $(s_1, s_2, \ldots s_N)$ for directory D, wherein $k_i$ is a non-negative number, and represents the weight for the corresponding tag $s_i$. In the following, in a directory tree with directory D as the root, the number of occurrences of $s_i$ in the tag vectors for all the files and null directories is called as a frequency. The weight $k_i$ is calculated according to the following equation:

$$k_i = (s_i \text{ frequency}) \bigg/ \sum_{i=1}^{N} (s_i \text{ frequency}).$$

The similarity $\gamma(T1, T2)$ between the tag vectors represented by $T1=(k_1, k_2, \ldots, k_N)$ and $T2=(k_1', k_2', \ldots k_N')$ are calculated according to the following equations:

$$\gamma(T1, T2) = \frac{k_1 k_1' + k_2 k_2' + \ldots + k_N k_N'}{\sqrt{k_1^2 + k_2^2 + \ldots + k_N^2} \cdot \sqrt{k_1'^2 + k_2'^2 + \ldots + k_N'^2}}$$

Here, the tag path for the received file is "(Download, newsong, MP3, Movie, AVI, Wind, Jack, Cind)\(newsong, MP3, Wind, Jack)\(newsong, MP3, Wind)". Let TV1 represents tag vector (Download, newsong, MP3, Movie, AVI, Wind, Jack, Cind), TV2 represents tag vector (newsong, MP3, Wind, Jack), and TV3 represents (newsong, MP3, Wind). The frequencies of tags MP3 and AVI in TV1 are 2, and the frequency of tag MP3 in TV2 is 2. The frequencies of other tags in TV1, TV2, TV3 are 1.

After step 802, A=0 and B=0. After step 803, v1=γ(TV1, TV200)=0.709, and X1 indicates the directory 200. At step 804, it is determined that directory X1 has a child directory. After step 806, γ(TV1, TV210)=0.454, v2=γ(TV1, TV211)=0.571. At step 807, it is determined that v1>v2. At step 809, it is determined that level B is not the lowest. At step 811, let B=1. And then the method returns to step 803. After step 803 again, v1=γ(TV2, TV200)=0.468, and X1 indicates the directory 200. At step 804, it is determined that directory X1 has a child directory. After step 806, γ(TV2, TV210)=0, v2=γ(TV2, TV211)=0.707. At step 807, it is determined that v1<v2. At step 808, let A=1. The method then returns to step 803. After step 803 again, v1=γ(TV2, TV211)=0.707, and X1 indicates the directory 211. At step 804, it is determined that directory X1 has a child directory. After step 806, v2=γ(TV2, TV222)=0.734. At step 807, it is determined that v1<v2. At step 808, let A=2. The method then returns to step 803. After step 803 again, v1=γ(TV2, TV222)=0.734, and X1 indicates the directory 222. At step 804, it is determined that directory x1 has no child directory and then the method ends. Therefore, path "Entertainment\Music\MP3" of the directory 222 is selected as the storage path.

In the above embodiments, there may be more than one candidate paths meeting the selection conditions. In this case, it is possible to perform the selection according to a predetermined criterion. For example, it is possible to simply select the first candidate path meeting the conditions, randomly select a candidate path meeting the conditions, select the candidate path of the most directory levels, select the candidate path of the highest similarity between the tag vectors for specific nodes, for example, the tag vector for the lowest node in the candidate path and the tag vector for the highest node in the tag path. Alternatively, the path selection device 502 may include a user selection interface (not shown). In case that there are a plurality of paths available to be selected by the path selection device, i.e., meeting the selection conditions, the user selection interface displays at least two of the plurality of paths to a user and a path selected by the user is treated as the storage path. In another alternative embodiment, in case that there are a plurality of paths available to be selected by the path selection device, i.e., meeting the selection conditions, the path selection device 502 may select all the paths meeting the selection conditions as the storage paths.

In an embodiment, the receiving device 503 receives the tag path before receiving the file. The path selection device 502 first selects the storage path according to the tag path. Then the receiving device 503 receives the file and stores the file in the selected storage path.

Figure 9:
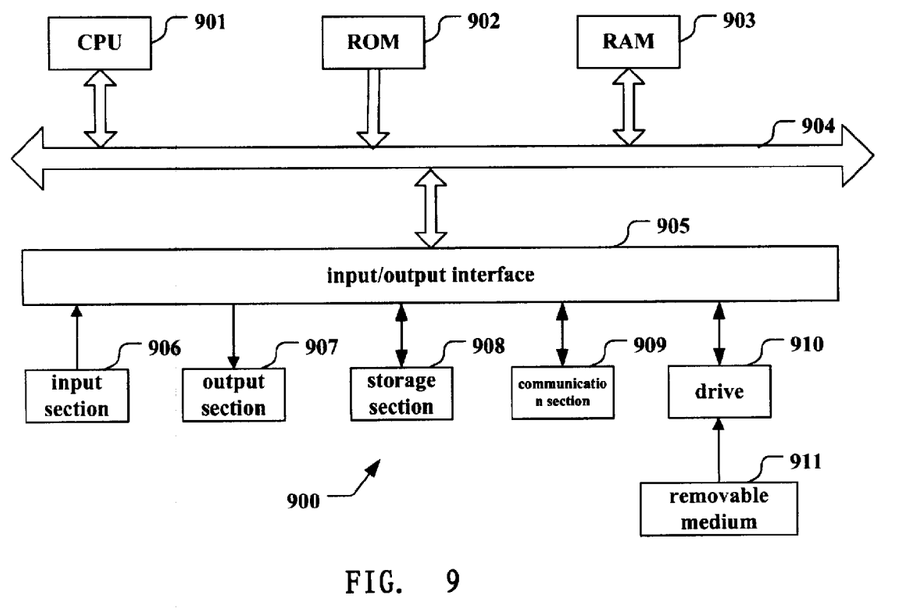
FIG. 9 is a block diagram showing the exemplary structure of a computer for implementing the present invention.

An environment for implementing the apparatus and the method of the present invention is as shown in FIG. 9. In FIG. 9, a central processing unit (CPU) 901 performs various processes in accordance with a program stored in a read only memory (ROM) 902 or a program loaded from a storage section 908 to a random access memory (RAM) 903. In the RAM 903, data required when the CPU 901 performs the various processes or the like is also stored as required.

The CPU 901, the ROM 902 and the RAM 903 are connected to one another via a bus 904. An input/output interface 905 is also connected to the bus 904.

The following components are connected to the input/output interface 905: An input section 906 including a keyboard, a mouse, or the like; an output section 907 including a display such as a cathode ray tube (CRT), a liquid crystal display (LCD), or the like, and a loudspeaker or the like; the storage section 908 including a hard disk or the like; and a communication section 909 including a network interface card such as a LAN card, a modem, or the like. The communication section 909 performs a communication process via the network such as the internet.

A drive 910 is also connected to the input/output interface 905 as required. A removable medium 911, such as a magnetic disk, an optical disk, a magneto-optical disk, a semiconductor memory, or the like, is mounted on the drive 910 as required, so that a computer program read from the medium is installed into the storage section 908 as required.

If the above-described steps and processes are implemented by software, the program that constitutes the software is installed from the network such as the internet or the storage medium such as the removable medium 911.

One skilled in the art should note that this storage medium is not limited to the removable medium 911 having the program stored therein as illustrated in FIG. 9, which is delivered separately from the approach for providing the program to the user. Examples of the removable medium 911 include the magnetic disk, the optical disk (including a compact disk-read only memory (CD-ROM) and a digital versatile disk (DVD)), the magneto-optical disk (including a mini-disk (MD)), and the semiconductor memory. Alternatively, the storage medium may be the ROM 902, the hard disk contained in the storage section 908, or the like, which have the program stored therein and is deliver to the user together with the method that containing them.

The present invention is described in the above by referring to specific embodiments. One skilled in the art will understand that various modifications and changes can be made without departing from the scope as set forth in the following claims.

What is claimed is:

1. Apparatus for receiving a file comprising:
a receiving device configured for receiving a file and at least one tag path associated with the file, said tag path having a lowest node and a highest node, each said node having a tag vector;
a path selection device configured for selecting at least one storage path from a plurality of candidate paths, wherein a similarity between the tag vector of the lowest node and the tag vector of the highest node in each tag path exceeds a predetermined threshold;
wherein the path selection device is further configured for selecting, as the storage path, a path for which:
for each node in the tag path, there is a node corresponding to each node in the selected path;
the level order between adjacent nodes in the tag path is consistent with the level order between corresponding nodes in the selected path; and
the similarity between each node of the tag path and the corresponding node in the selected path is greater than the similarity between any node below the each node and the corresponding node; and
a storage device configured for storing the file under the storage path.

2. The apparatus for receiving a file according to claim 1, wherein the receiving device is further configured for receiving the tag path in order to select the storage path before receiving the file.

3. The apparatus for receiving a file according to claim 1, wherein the path selection device is further configured for selecting the path of maximum levels as the storage path.

4. The apparatus for receiving a file according to claim 1, wherein the path selection device is further configured for selecting the path of the highest similarity as the storage path.

5. The apparatus for receiving a file according to claim 1, wherein the path selection device comprises a user selection interface configured for displaying at least two paths to a user and treating a path selected therefrom by the user as the storage path.

6. A method of receiving a file comprising the steps of:
receiving a file;
receiving at least one tag path associated with the file, wherein said tag path
has a lowest node and a highest node, each said node having a tag vector;
selecting at least one storage path for which a similarity between the tag vector of the lowest node and the tag vector of the highest node exceeds a predetermined threshold;
wherein the selecting step includes selecting as the storage path, a path for which:
for each node in the tag path, there is a node corresponding to each node in the selected path;
the level order between adjacent nodes in the tag path is consistent with the level order between corresponding nodes in the selected path; and
the similarity between each node of the tag path and the corresponding node in the selected path is greater than that between any node below the each node and the corresponding node; and
storing the file under the storage path.

7. The method of receiving a file according to claim 6, wherein the storage path is selected before the file is received.

8. The method of receiving a file according to claim 6, wherein the selecting step includes selecting the path of maximum levels as the storage path.

9. The method of receiving a file according to claim 6, wherein the selecting step includes selecting the path of the highest similarity as the storage path.

10. The method of receiving a file according to any claim 6, wherein the selecting step comprises:
   displaying at least two paths to a user and treating a path selected by the user therefrom as the storage path.

11. Apparatus for transmitting a file comprising:
   a path obtaining device configured for obtaining a tag vector for each node in the path of a file and transmitted in a hierarchical tree structure, and generating a tag path for the file; and
   for each node in the tag path, there is a node corresponding to each node in the selected path;
   the level order between adjacent nodes in the tag path is consistent with the level order between corresponding nodes in the selected path; and
   the similarity between each node of the tag path and the corresponding node in the selected path is greater than the similarity between any node below the each node and the corresponding node
   a transmitting device configured for transmitting the tag path and the file.

12. The apparatus for transmitting a file according to claim 11, wherein the transmitting device is further configured for transmitting the tag path before transmitting the file.

13. The apparatus according to claim 1, further comprising:
   an apparatus for transmitting a file, wherein said apparatus for transmitting a file includes (i) a path obtaining device configured for obtaining a tag vector for each node in the path of a file and transmitted in a hierarchical tree structure, and generating a tag path for the file; and (ii) a transmitting device configured for transmitting the tag path and the file.

* * * * *